United States Patent [19]

O'Connor et al.

[11] 3,856,724
[45] Dec. 24, 1974

[54] REINFORCED THERMOPLASTIC COMPOSITIONS

[75] Inventors: James J. O'Connor, Poughkeepsie; John T. Nolan, Jr., Wappingers Falls, both of N.Y.

[73] Assignee: Texaco Inc., New York, N.Y.

[22] Filed: Feb. 4, 1974

[21] Appl. No.: 439,208

Related U.S. Application Data

[62] Division of Ser. No. 111,087, Jan. 29, 1971, abandoned.

[52] U.S. Cl. 260/17.4 CL, 117/123 D, 117/126 AB, 117/126 GR, 117/143 A, 260/42.14, 260/42.18, 260/42.29, 260/42.45
[51] Int. Cl. .......................... C08f 45/04, C08f 45/18
[58] Field of Search .............. 260/17.4 CL, DIG. 31; 117/143 A

[56] References Cited
UNITED STATES PATENTS
2,832,747   4/1958   Jackson ...................... 260/17.4 CL
3,650,814   3/1972   Elder ............................ 260/41 AG
3,661,628   5/1972   Morsden ...................... 260/41 AG Primary Examiner—Morris Liebman
Assistant Examiner—J. H. Derrington
Attorney, Agent, or Firm—T. H. Whaley; C. G. Ries

[57]   ABSTRACT

Novel reinforced thermoplastic compositions are prepared by admixing a reinforcing agent which can be, for example, glass fiber or alpha-cellulose with a polyolefin such as polyethylene, polypropylene, polyisobutylene, etc. and a minor amount of an ionic hydrocarbon copolymer, such as an ethylene-methacrylic acid copolymer which has been reacted with an ionizable metal compound. In another aspect of this invention reinforcing agents of the type previously mentioned are coated with the ionic hydrocarbon copolymer and the resulting coated, reinforcing agent added by milling to a polyolefin to yield a thermoplastic composition of high tensile strength.

10 Claims, No Drawings

REINFORCED THERMOPLASTIC COMPOSITIONS

STATEMENT OF THE INVENTION

This is a division of application Ser. No. 111,087, filed Jan. 29, 1971, now abandoned.

This invention relates to new, reinforced, thermoplastic compositions. More particularly, this invention relates to thermoplastic compositions comprising a polyolefin, a reinforcing agent and a minor amount of an ionic hydrocarbon polymer having solid state properties characteristic of crosslinked polymers and melt fabricability properties characteristic of a thermoplastic polymer.

DESCRIPTION OF THE PRIOR ART

It is well known in the art that polymeric compositions can be "filled" with inorganic substances. Such inorganic materials do not enter into the polymerization process and they can be mixed with the monomer feed or polymer product so as to form a uniform finished reinforced material. At first, fillers of various types were used in the polymeric materials to color the polymer, change the co-efficient of expansion, improve abrasion resistance, modulus and strength, and to dilute the polymer in an attempt to lower the cost. Generally, the filler is admixed with the polymer in one of several ways so as to effect the mechanical bond between the two components. One method has been to mix thoroughly a monomer and filler and subsequently polymerize the monomer and in this way produce a composition in which the filler is intimately dispersed throughout the finished product. In another method, the molten polymer and the filler are subjected to shearing forces whereby the filler is forced into some type of mechanical bond with the polymer upon cooling. A variety of other methods of achieving mechanical bonding of fillers to polymers are also well known in the art, however, all of these processes suffer from one or more disadvantages.

It has been found, however, that the upper limit of filler that can be used in mechanical mixtures without adversely affecting the physical properties of the product is low. In fact, the tensile and flexural strengths of some polymer systems, such as the polyolefins, fall off sharply at relatively low concentrations of the filler material. This has been noted to be true even with fibrous materials, such as fibrous glass particles in the case of the reinforced polyolefin products.

A number of processes have been described in the prior art disclosing combinations of couplers, organic matrices and inorganic reinforcement in attempts to form reinforced polymeric compositions with improved physical properties. In U.S. Pat. No. 3,272,772 chlorinated, high-density polyethylene compositions containing mineral fillers such as alumina, barytes, calcium carbonate, etc. improved by treatment with certain vinyl polymers such as vinyl ethers, vinyl esters, etc., are described. Likewise, reinforced polymeric compositions such as reinforced polyethylene, polypropylene, etc. have been prepared employing siliceous minerals such as silica gel, quartz, cristobalite, wollastonite, etc. pretreated with a base, such as lithium hydroxide and a coupling agent as exemplified by 3-aminopropyl trichlorosilane.

It is a primary object of this invention to provide reinforced thermoplastic compositions with improved physical properties.

It is a further object of this invention to provide valuable polyolefin compositions reinforced, for example, with glass fiber, alpha-cellulose, etc. which contain an ionic hydrocarbon copolymer.

It is still another object of this invention to provide a method for treating reinforcing materials with certain ionic hydrocarbon polymers to improve their coupling capacity to polyolefins.

Additional objects, advantages and benefits will become apparent as a detailed description of the invention proceeds.

SUMMARY OF THE INVENTION

In its broadest aspect, this invention relates to reinforced, thermoplastic compositions comprising a polyolefin such as polyethylene, a reinforcing agent and a minor amount of an ionic hydrocarbon polymer. In another aspect of this invention, the novel, reinforced, thermoplastic compositions are prepared by treating the reinforcing materials with the ionic hydrocarbon polymer itself or by contacting the reinforcement with a solution of the ionic hydrocarbon polymer in an inert liquid and afterwards, for example, milling the thus-treated reinforcing material into a polyolefin to form a reinforced thermoplastic composition of improved physical properties. The reinforcement materials are treated in such a manner that they retain adsorbed on their surfaces a small amount of the ionic hydrocarbon copolymer.

It has been found that reinforced polyolefin compositions can be prepared utilizing the ionic hydrocarbon copolymers which exhibit tensile strengths which are up to 50 percent or more greater than compositions comprising only the polyolefin and the reinforcing agent.

A dual function is performed by the reinforcing agents in the finished compositions. Such materials serve as inexpensive diluents for the polymer and thus lower the cost of the final product. Most important, however, is that these reinforcing agents when utilized in the novel compositions of this invention produce finished compositions with physical properties far superior to those of unreinforced polymers thus permitting their use in a number of applications heretofore unsuited for such materials.

DETAILED DESCRIPTION OF THE INVENTION

Polyolefins which may be employed in preparing the reinforced thermoplastic compositions of this invention include polyethylene, polypropylene, polybutene, polypentene, polyhexene and isomers thereof. Mixtures of these olefin polymers can also be utilized in preparing the novel compositions of this invention. Both high density and low density polyolefins, in general, are suitable for use in the novel thermoplastic compositions. In the specification the phrase "High Density Polyethylene" (abbreviated HDPE) refers to polyethylene having a density of about 0.95 to about 0.97 g./cc. while the phrase "Low Density Polyethylene" (abbreviated LPDE) relates to polyethylene having a density of about 0.91 to about 0.94 g./cc. In preparing the novel compositions of this invention, low density polyethylene is a preferred polyolefin.

A wide variety of reinforcing materials can be utilized in preparing the compositions of this invention including alpha-cellulose, cellulosic fibers such as jute and sisal, and siliceous minerals, such as mineral silicates, and other siliceous materials. Synthetically prepared siliceous materials are also useful, such as fume silica and silica obtained by evaporation of silica sol. Examples of other useful reinforcing agents include quartz and other forms of silica such as silica gel, glass fiber, cristobalite, etc., mineral silicates such as wollastonite, mullite, sillimanite, asbestos such as chrysotile which is a hydrated magnesium silicate, crocidolite, other calcium magnesium silicates, forsterite, a magnesium silicate, and clays such as kaolinite, bentonite, montmorillonite, saponite, attapulgite, etc. The most desirable fibrous reinforcing agents include glass fiber and alpha-cellulose. Mixtures of the various reinforcing agents may be employed, if desired.

A wide variety of glass fibers can be employed in preparing the novel compositions of this invention including yarns, rovings, chopped strand, etc. Chopped strand having lengths ranging from one-eighth to 2 inches or more with diameters ranging from about 0.00012 to about 0.00075 inch or more is an especially useful reinforcement material.

The amount of reinforcing agent utilized can be varied over a wide range with the maximum content being limited primarily by the ability of the polymer to bind the reinforcing medium into a cohesive mass. Thus, reinforced polymeric compositions of this invention can be prepared containing as much as 35 to about 45 percent by weight of the reinforcing agent.

With regard to the lower range of the amount of reinforcing material, this is limited only insofar as it is necessary to have sufficient reinforcement present to effect an improvement in physical properties of the polymeric composition. For example, concentrations as low as about 5 to about 10 percent by weight based on the reinforced thermoplastic composition can be employed, if desired. Preferably, the concentration of the reinforcing material in the finished, reinforced thermoplastic composition will be from about 10 to about 40 percent by weight.

The particle size distribution of the granular reinforcement materials can be varied widely and generally particle sizes which will pass a 60 mesh screen (250 microns in the smallest dimension) are small enough to be used in the compositions of this invention, although particles as large as 1,000 microns (18 mesh) can also be employed.

Ionic hydrocarbon copolymers utilized in the novel thermoplastic compositions of this invention comprise a polymer of an alpha-olefin, the olefin content of the said polymer being at least 50 mole percent based on the polymer, and an alpha, beta-ethylenically unsaturated carboxylic acid having 1 to 2 carboxylic acid groups, the acid monomer content of the said polymer being from 0.2 to 25 mole percent based on the polymer, said carboxylic acid-containing polymer containing uniformly distributed throughout the polymer one or more metal ions having ionized valences of 1 to 3 inclusive where the acid comonomer is monocarboxylic and an ionized valence of 1 where the acid comonomer is dicarboxylic, the quantity of the metal ion being sufficient to neutralize at least 10 percent of the said carboxylic acid. The preparation of such ionic hydrocarbon copolymers is described in detail in U.S. Pat. No. 3,264,272 which is incorporated herein by reference in its entirety.

The ionic hydrocarbon copolymers described are quite different in their properties in that the ionic attraction results in a form of crosslinking which occurs in the solid state. However, when the copolymer is molten and subjected to shear stresses which occur during melt fabrication, the ionic crosslinks are ruptured and the copolymers exhibit melt fabricability essentially the same as that of linear base copolymers. On cooling of the melt, because of their ionic nature, the crosslinks are reformed and the solidified copolymer again shows the properties of a crosslinked material.

The alpha-olefin polymers employed in a formation of the ionic hydrocarbon copolymers previously mentioned are copolymers of alpha-olefins with ethylenically unsaturated acids. The alpha-olefins employed in the copolymers are alpha-olefins which have the general formula:

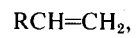

$$RCH=CH_2,$$

where R is either hydrogen or an alkyl radical having preferably from 1 to 8 carbon atoms. Suitable olefins include ethylene, propylene, butene-1, pentene-1, hexene-1, heptene-1, 3-methylbutene-1,4-methyl-pentene-1, etc. The concentration of the alpha-olefin is at least 50 mole percent of the copolymer and preferably is greater than 80 mole percent.

The alpha, beta-ethylenically unsaturated carboxylic acid group containing monomer has preferably from 3 to 8 carbon atoms. Examples of such monomers include acrylic acid, methacrylic acid, ethacrylic acid, itaconic acid, maleic acid, fumaric acid, monoesters of said dicarboxylic acids, such as methyl hydrogen maleate, methyl hydrogen fumarate, etc. Although maleic anhydride is not a carboxylic acid in that it has no hydrogen attached to the carboxyl group, in the specification, it is considered an acid for purposes of defining the ionic hydrocarbon copolymers. Similarly other alpha, beta-monoethylenically unsaturated anhydrides of carboxylic acids can be employed. The concentration of the acidic monomer in the copolymer, as previously pointed out, is from 0.2 mole percent to 25 mole percent and, preferably, from 1 to 10 mole percent.

The copolymers may be obtained by the copolymerization of a mixture of the olefin and the carboxylic acid monomer by methods which have been well described in the literature. Preferred copolymer products are those obtained from base copolymers in which the carboxylic acid groups are randomly distributed over all the copolymer molecules. Such copolymers are prepared by conducting the polymerization of the alpha-olefin and carboxylic acid monomers in a single phase environment, i.e. one in which all of the monomers are soluble, e.g. benzene, ethylene, etc. which may be in liquid or vaporized form. In a preferred process a mixture of the two monomers is introduced into a polymerization environment maintained at elevated temperatures of from about 100° to about 300°C, together with a free radical polymerization initiator such as a peroxide.

Copolymers utilized to form the desired ionic hydrocarbon copolymers which are useful in the compositions of this invention are preferably of high molecular weight in order to achieve outstanding combination of the solid state properties of crosslinked polyolefins with the melt fabricability of uncrosslinked polyolefins. The molecular weight of the copolymers useful as base resins is defined by melt index, a measure of viscosity, described in detail in ASTM-D-123A-57T. The melt index of copolymers employed in the formation of ionic hydrocarbon copolymers useful in this invention preferably are in the range of 0.1 to 1,000 g./10 minute and, more particularly, in the range of 1.0 to 100g./10/minute.

The copolymer base can be a two-component polymer or other copolymerizable monoethylenically unsaturated monomers may also be employed in the composition provided the olefin content of the final copolymer is at least 50 mole percent. Base copolymers suitable for use in preparing the desired ionic hydrocarbon copolymers include, for example, ethylene/acryl acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethyl/methyl hydrogen maleate/ethyl acrylate copolymers, ethylene/acrylic acid/vinyl alcohol copolymers, ethylene/fumaric acids, ethylene/vinyl chloride/acrylic acid copolymers, ethylene/vinylidene chloride/acrylic acid copolymers, ethylene/vinyl fluoride/methacrylic acid copolymers, ethylene/chlorotrifluorethylene/methacrylic acid copolymers.

The ionic hydrocarbon copolymers are prepared by reacting the desired copolymer base with an ionizable metal compound and this reaction is referred to herein as "neutralization". It is believed that the surprising properties of the ionic hydrocarbon copolymers are the result of ionic attraction between the metal ion and one or more ionized carboxylic acid groups, although the exact structure of these copolymers is not completely understood.

Although an improvement in the solid state properties of the novel ionic hydrocarbon copolymers is obtained with even a small percentage of the acid group neutralized, in general it is found that base copolymers having molecular weights as measured by a melt index of 1 to 5 g./10 min. and a monocarboxylic acid concentration of 5 to 10 percent show optimum solid state properties upon 50 to 80 percent neutralization.

Metals ions suitable in forming the ionic hydrocarbon copolymers can be divided into two general groups, uncomplexed metal ions and complexed metal ions. In the uncomplexed metal ions, the valence of the ion corresponds with the valence of the metal and these metal ions are obtained from the commonly known and used metal salts, while the complexed metal ions are those in which the metal is bonded to more than one type of salt group, at least one of which is ionized and at least one of which is not. The preferred complexed metal ions are those in which all but one metal valences are complexed and readily ionized, and such compounds are in particular the mixed salts of very weak acids, such oleic and stearic acids with ionizable acids, such as formic and acetic acids.

Uncomplexed metal ions which are suitable for forming the ionic copolymers useful in the present invention are the alpha-olefin-monocarboxylic acid copolymers, mono-di-trivalent ions of metal in Groups I, II, III, IV-A and VIII of the Periodic Table of Elements (see page 392, Handbook of Chemistry & Physics, Chemical Rubber Publishing Co., 37th Edition). Uncomplexed monovalent metal ions of the metals in the groups mentioned above are also suitable in forming the ionic copolymers with copolymers of olefins and ethylenically unsaturated dicarboxylic acids. Suitable monovalent metal ions are $Ag^+$, $Hg^+$ and $Cu^+$. Useful divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions include $Al^{+3}$, $SC^{+3}$, $Fe^{+3}$ and $Y^{+3}$.

The preferred metals are the alkali metals since they result in ionic copolymers having the best combination of improvement in solid state properties with retention of melt fabricability. More than one metal ion may be employed in the formation of the ionic hydrocarbon copolymers, if desired.

The quality of ions employed of the degree of neutralization will differ with the degree of solid property change and the degree of melt property change desired, however, it is found that the concentration of the metal ions should be at least such that the metal ion neutralizes at least 10 percent of the carboxylic acid groups up to about 90 percent of the carboxylic acid groups.

Crosslinking of the ionic copolymer is accomplished by the addition of the metal compound to the base copolymer. The metal compound employed must have at least one of its valences satisfied by a group which is substantially ionized in water. Also, the metal compound must be such that the salt radical reacting with the hydrogen of the carboxylic acid group must form a compound removable from the copolymer at the reaction conditions. Formates, acetates, hydroxides of sufficient solubility, methoxides, ethoxides, nitrates, carbonates and bicarbonates are the preferred metal salts. The crosslinking reaction is carried out under conditions which allow for a homogeneous, uniform distribution of the crosslinking agent in the base copolymer. Although no particular reaction conditions are essential, the conditions chosen permit the removal of the hydrogen-salt radical reaction product which is preferably accomplished by volatilization. Generally, elevated temperatures are employed in carrying out the crosslinking reaction and usually the reaction is conducted either by melt blending the polymer with the crosslinking metal compound which preferably is employed in solution or by adding the crosslinking agent, directly or in solution, to a solution of the copolymer base and then, on reaction, precipitating and separating the resulting polymer.

The amount of the ionic hydrocarbon copolymer utilized in the reinforced thermoplastic compositions whether adsorbed on the surface of the reinforcement or added directly to the mix can be varied widely. Generally, the amount of the ionic hydrocarbon copolymer will be from about 0.05 to about 35 percent by weight and, preferably, from about 1 to about 30 percent by weight based on the weight of the reinforced thermoplastic composition.

The preparation of a number of ionic hydrocarbon copolymers suitable for use in the composition of this invention is set out below:

PREPARATION A

A 400 g. sample of an ethylene/methacrylic acid copolymer, containing 10 weight percent of methacrylic acid and having a melt index of 5.8 g./10 min. (ASTM-D1238-57T) is banded on a 6 inch rubber mill at 140°C. After the copolymer has attained the mill temperature, 25 g. of sodium methoxide dissolved in 100 ml. of methanol is added to the copolymer over a period of 10 minutes as working of the copolymer on the mill is continued. Melt blending of the composition is continued for an additional 15 minutes during which time the initially soft, fluid melt becomes stiff and rubbery on the mill. However, the polymer could still be readily handled on the mill. The resulting product is found to have a melt index of less than 0.1 g./10 minutes and is transparent, as compared to opaque for the copolymer base.

PREPARATION B

To a solution of 60 g. of an ethylene/methacrylic acid copolymer containing 10 weight percent of methacrylic acid and having a melt index of 5.8 g./10 minutes in 250 ml. of xylene maintained at a temperature of 100°C. is added 4 g. of strontium hydroxide dissolved in 50 ml. of water. Gelation follows immediately. The product is recovered by precipitation with methanol and washed thoroughly with water and acetone. The final dry product is found to have a melt index of about 0.18 g./10 minutes.

PREPARATION C

To 45 g. of an ethylene/methacrylic acid copolymer containing 10 weight of methacrylic acid and having a melt index of 5.7 g./10 minutes milled at a temperature of 125° to 135°C on a 6 inch rubber mill there is added gradually 6.3 g. of magnesium acetate ($X4H_2O$) in 25 ml. of water. Milling is continued for 15 minutes at which time the evolution of acetic acid ceases. The clear product has a melt index of about 0.12 g./10 minutes.

PREPARATION D

To 48 g. of an ethylene/itaconic acid copolymer having a melt index of 9.5 g./10 minutes and containing 4 percent by weight of the copolymer of itaconic acid there is gradually added 3 g. of sodium hydroxide in 30 ml. of water while the polymer is worked on a 6 inch rubber mill at a temperature of 160°C. Upon addition of the hydroxide, the polymer melt becomes stiff, transparent and elastomeric.

PREPARATION E

To 48 g. of a copolymer of ethylene and maleic anhydride, containing 6.5 weight percent of copolymerized maleic anhydride and having a melt index of 8 g./10 minutes, being milled on a rubber mill at a temperature of 130°C there is added 22 g. of zinc monoacetate monostearate. After 20 minutes on the mill a transparent, tough resilient polymer product is obtained.

The mixing of the polyolefin with the reinforcement agent and the ionic hydrocarbon copolymer to produce a uniform dispersion of the reinforcement agent throughout the body of the resulting plastic product can be accomplished in an internal mixer, such as a Banbury-type mixer, a screw extruder or an external mixer, such as a differential roll mill.

As previously pointed out, the reinforcing materials can be treated with the ionic hydrocarbon copolymer in such a manner that the said agent retains adsorbed on its surface a small amount of the copolymer. This can be carried out by treating the reinforcing agent with the molten monomer itself or by contacting the reinforcement material with a hot (i.e., at about 80° to about 120°C) solution of the monomer in an inert liquid, such as monochlorobenzene, toluene or xylene. Generally, the concentration of the ionic hydrocarbon copolymer in the solution will range from about 0.05 to about 20 grams per liter and, preferably, it will be from about 0.1 to about 12 grams per liter. After the reinforcing agent and the monomer or monomer solution have been thoroughly mixed, preferably at high speed, the treated reinforcing agent can be separated from any excess ionic hydrocarbon copolymer or from the solution of the said ionic hydrocarbon copolymer by various methods, such as by decantation or by filtering. Subsequently, in the case in which a solvent is employed, the treated reinforcing agent is dried to remove excess solvent, preferably at room temperature or at a slightly elevated temperature in a vacuum oven. Afterwards, the reinforcing agent having adsorbed and/or coated on its surface a small amount of the ionic hydrocarbon copolymer (i.e., about 0.05 to about 0.5 weight percent) can be incorporated in the polyolefin composition by any of several well known in the art such as by using an internal mixer, or by employing a differential roll mill, etc.

Although, as previously pointed out, a wide variety of polyolefins can be utilized in preparing the novel thermoplastic compositions of this invention, it has been found that compositions formed with high density polyethylene, (density 0.96) the ionic hydrocarbon copolymer and alpha-cellulose possess tensile strengths less than that of the composition formed solely with high density polyethylene and alpha-cellulose. Therefore, high density polyethylene-ionic hydrocarbon copolymer-alpha-cellulose compositions do not form a part of this invention.

It has been found that the physical properties of the reinforced thermoplastic compositions can be further improved by treating the ionic hydrocarbon copolymers with a mineral acid prior to incorporation in the thermoplastic composition. It is believed that in such a treatment process at least a portion of the carboxylic acid groups are converted to the acid form. Acid treated-ionic hydrocarbon copolymers useful in the thermoplastic compositions of this invention can be prepared by contacting the ionic copolymer in finely-divided solid form with an aqueous solution of a mineral acid such as hydrochloric acid, sulfuric acid, etc. containing from about 0.5 to 15 percent or more by weight of the acid, for a period of from about 1 to about 60 hours and at a temperature ranging from about 20°F to about 150°F or more, followed by drying of the copolymer at about 180° to about 200°F.

The novel reinforced thermoplastic compositions of this invention can be fabricated by molding techniques such as compression of injection molding, by calendering or by extrusion, etc. The improved physical properties of the reinforced thermoplastic composition of this invention permit their use in many applications in which the unreinforced materials are entirely unsuitable, such as for the fabrication of tables, chairs, drawers and other furniture and furniture components, heavy duty equipment housings, automobile parts and building construction components. Further, the novel compositions are highly useful in applications in which unreinforced polymers have been employed but where increased strength and rigidity are desirable features.

The reinforced thermoplastic compositions of this invention can contain other materials in addition to the polyolefin, the ionic hydrocarbon copolymer and the reinforcement agents mentioned previously, such as dyes, heat stabilizers, light stabilizers, antioxidants and other modifiers provided the amount of the additional modifier is such as to not produce an unduly adverse effect upon the final properties of the thermoplastic composition.

Various embodiments of the invention are illustrated in the following examples which are to be considered not limitative:

EXAMPLES I–III

In this first series of experiments low density polyethylene compositions reinforced with ½-inch chopped glass fiber which had been coated with a sodium cross-linked, ethylene-methacrylic acid ionic hydrocarbon copolymer having a melt index of 0.12 g/10 min. (Ionic Hydrocarbon Copolymer H — prepared in the same manner as Preparation A) were formulated.

In preparing the coated fiber, the ½-inch chopped glass fiber specimens (Code 112 — glass micro fiber having an average diameter of from 2.6 to 3.8 microns, random lengths) were soaked in a solution of the ionic hydrocarbon copolymer previously described in hot monochlorobenzene. The solutions and the fiber mixtures were cooled to about room temperature at which point the excess liquid was decanted and the wet fibers were then dried in a vacuum oven at 60°C.

Blends of the low density polyethylene together with the glass fiber reinforcement coated with the ionic hydrocarbon copolymer were prepared on a two-roll mill. These blends were made by pouring the low density polyethylene pellets into the nip between the hot rolls in increments until the polymer was molten on the rolls. The fiber reinforcement was added to the nip and the resulting composite was cut off the rolls and fed back in at right angles frequently to facilitate mixing and hinder the orientation of the fibers. After a given time, the crepe was cut off and removed from the mill in the form of a long flat sheet about 20 inches × 6 inches. The conditions as used for milling the composites prepared in this series of examples were as follows:

MILLING CONDITIONS

| | LDPE |
|---|---|
| Front Roll Set Point, °F | 270 |
| Front Roll Powerstat Setting | 40 |
| Back Roll Set Point, °F | 170 |
| Back Roll Powerstat Setting | 0 |
| Time, Minutes | 15 |
| Indicated Roll Speed, ft/minute | 20 |
| Minimum, Gap, in. | 0.030 |

Samples for testing were prepared by first molding the composite into sheets 6½ × 10 inches in area. A piece approximately 3 × 7 inches and weighing about 15 grams was cut from the mill crepe in such a manner that the length of the piece was in the direction of the length of the crepe. This piece of crepe was placed in a frame mold with the length in the direction of the length of the frame. The sample and the frame were sandwiched between two sheets of polyester film and two chrome-plated steel back-up plates following which the sandwich was placed between heated platens of the press. The jaws were closed to form contact for a few minutes to melt the polymeric composition (temperature 320°F, time 4 min.) after which the pressure was raised to 25 tons for 4 minutes. Tensile strength was determined on a ½-inch wide strip cut from the 10 mil sheet.

Further details relating to the reinforced LDPE compositions prepared in this series are set forth in Table 1 which follows:

TABLE 1

LDPE Reinforced with 20 Weight Percent Glass Fiber (Code 112) Coated from a Solution of Ionic Hydrocarbon Copolymer H in Hot Chlorobenzene

| Example No. | Solution[1] Concentration, g/l | Tensile Strength psi | Elongation % |
|---|---|---|---|
| I | 0 | 1390 | 26 |
| II | 0.1 | 1450 | 15 |
| III | 1.0 | 1530 | 19 |

[1]Nominal concentrations. It is not certain that polymer was completely dissolved.

EXAMPLES IV–VIII

In this second series of examples a number of reinforced compositions were prepared in which the ionic hydrocarbon copolymer previously described in the first series of tests (Copolymer H) was milled into a quantity of low density polyethylene following which the glass fiber (Code 112) was milled as previously described into the composition. Milling conditions were the same as in Examples I–III.

The samples of the reinforced thermoplastic compositions were evaluated in the same manner as employed in Examples I–III above.

Details relating to these experiments (Examples IV–VIII) are set forth in Table 2 which follows:

TABLE 2

LDPE - Glass Fiber - Ionic Hydrocarbon Copolymer H Compositions Blended in Mill

| Example No. | Wt.%[1] Copolymer H | Wt.%[2] Glass Fiber (Code 112) | Tensile Strength psi | Elongation % |
|---|---|---|---|---|
| IV | 0 | 20 | 1350 | 37 |
| V | 1 | 20 | 1550 | 9 |
| VI | 5 | 20 | 1740 | 7 |
| VII | 10 | 20 | 1760 | 9 |
| VIII | 30 | 20 | 1830 | 11 |

[1,2]Wt. % based on the weight of the total composition.

EXAMPLES IX–XIII

In this series of examples, compositions were prepared using low density polyethylene (density 0.92), the same ionic hydrocarbon copolymer described in the first series of tests (Ionic Hydrocarbon Copolymer H) and alpha-cellulose (100 mesh flock) as a reinforcing agent. Preparation of the compositions was accomplished in the same manner as described in the second series of examples above. Likewise, molding and testing of the plastic sheets were carried out in the same manner as previously described above. Data setting forth results obtained in these examples are shown in Table 3 which follows:

TABLE 3

LDPE - Alpha-Cellulose -Ionic Hydrocarbon Copolymer H Compositions

| Example No. | Wt.%[1] Copolymer H | Wt.%[2] Alpha-Celluose[3] | Tensile Strength psi | Elongation % |
|---|---|---|---|---|
| IX | 0 | 20 | 1410 | 9 |
| XI | 1 | 20 | 1750 | 15 |
| XII | 5 | 20 | 1590 | 14 |
| XIII | 10 | 20 | 1630 | 14 |

[1,2]Wt. % based on weight of total composition.
[3]alpha-celluose (100 mesh flock).

EXAMPLES XIV TO XVII

A number of compositions were prepared using high density polyethylene (density 0.96) with the ionic hydrocarbon copolymer as described in the first series of examples above (Ionic Hydrocarbon Copolymer H) and ½-inch chopped glass fibers (Code 112). These compositions were prepared in the same manner as previously described in Examples IV–VIII above, except different milling conditions were employed which are set forth below:

MILLING CONDITIONS

|  | HDPE |
|---|---|
| Front Roll Set Point, °F | 300 |
| Front Roll Powerstat Setting | 70 |
| Back Roll Set Point, °F | 275 |
| Back Roll Powerstat Setting | 45 |
| Time, Minutes | 15 |
| Indicated Roll Speed, ft/min | 20 |
| Minimum Gap, inch | 0.030 |

Testing of the specimens was carried out in the same manner as in the third series of examples. Data relating to these examples are set forth in Table 4 which follows:

TABLE 4

HDPE - Glass Fiber - Ionic Hydrocarbon Copolymer H Compositions Blended in Mill

| Example No. | Wt.%[1] Copolymer H | Wt.%[2] Glass Fiber (Code 112) | Tensile Strength psi | Elongation % |
|---|---|---|---|---|
| XIV | 0 | 20 | 4050 | 7 |
| XV | 1 | 20 | 4530 | 4 |
| XVI | 10 | 20 | 4450 | 4 |
| XVII | 30 | 20 | 4500 | 4 |

[1,2]Wt. % based on weight of total composition.

EXAMPLES XVIII–XXI

IN this series of experiments the ionic hydrocarbon copolymer which was the same as that employed in the first series of experiments (i.e. Examples I–III) was modified by treatment with hydrochloric acid. The polymer, in finely divided form, was added to a 5 weight percent aqueous hydrochloric acid and was maintained in the solution for 30 hours at 80°C. The hydrochloric acid solution was decanted and the polymer thus treated dried at a temperature of about 190°F. The reinforced, thermoplastic compositions were prepared by milling low density polyethylene (density 0.92), acid-treated ionic hydrocarbon copolymer H and ½-inch chopped glass fiber (Code 112) in the same manner as in the previous series of experiments and testing of the compositions was conducted with the same equipment and in the same way as previously described. Details relating to these experiments are found in Table 5 which follows:

TABLE 5

LDPE - Glass Fiber - Acid-Treated Ionic Hydrocarbon Copolymer H Compositions-Blended in Mill

| Example No. | Wt.%[1] of Acid Treated Copolymer H | Wt.%[2] of Glass Fiber (Code 112) | Tensile Strength psi |
|---|---|---|---|
| XVIII | 0 | 20 | 1350 |
| XIX | 0.5 | 20 | 1420 |
| XX | 1.0 | 20 | 1520 |
| XXI | 5.0 | 20 | 1920 |

[1,2]Wt.% based on weight of total composition.

EXAMPLES XXII–XXVI

In this series of examples reinforced compositions are prepared in the same manner as in Examples IV–VIII above, utilizing as the polyolefin either polyethylene or polypropylene with a number of different ionic hydrocarbon copolymers and with glass fiber, alpha-cellulose or asbestos fiber as the reinforcing agent. Details relating to these examples are set forth in Table 6 below:

TABLE 6

| Example No. | Ionic Hydrocarbon Copolymer | | Reinforcement Material | | Polyolefin | |
|---|---|---|---|---|---|---|
| | Type | Percent By Wt.[1] | Type | Percent By Wt.[1] | Type | Percent By Wt.[1] |
| XXII | Ethylene/10 wt.percent methacrylic acid copolymer crosslinked with sodium (Melt index 0.09 g./10 min.) | 8 | Glass fiber (½" chopped fibers) | 15 | Polypropylene (Density 0.92, Mole wt.45,000) | Balance |
| XXIII | Ethylene/10 wt.percent methacrylic acid copolymer crosslinked with strontium (Melt index 0.19 g./10 min.) | 15 | Alpha-Cellulose | 22 | Low Density Polyethylene (Density 0.90) | do. |
| XXIV | Propylene/8 wt.percent methyl hydrogen maleate copolymer crosslinked with potassium (Melt index 0.20 g./10 min.) | 20 | Glass Fiber (½" chopped fibers) | 12 | High Density Polyethylene (Density 0.95) | do. |
| XXV | Ethylene/10 wt.percent methacrylic acid copolymer crosslinked with magnesium (Melt index 0.12 g./10 min.) | 18 | Glass Fiber (½" chopped fibers) | 10 | Polypropylene (Density 0.93, Mole wt.48,000) | do. |
| XXVI | Propylene/7 wt.percent acrylic acid copolymer crosslinked with aluminum (Melt index 0.18 g./10 min.) | 10 | Chrysotile | 14 | Low Density Polyethylene (Density 0.91) | do. |

[1]Based on the total weight of the composition.

On testing it is found that the reinforced compositions all exhibit a significant increase in tensile strength over the identical composition prepared without the ionic hydrocarbon copolymer.

What is claimed is:

1. A reinforced thermoplastic composition comprising from about 5 to about 45 percent by weight of alpha-cellulose, from about 0.05 to about 35 percent by weight of an ionic hydrocarbon copolymer with the balance being a polyolefin selected from the group consisting of low density polyethylene, polypropylene and polybutene, the said ionic hydrocarbon copolymer comprising a copolymer of an alphaolefin having the formula:

$$R-CH=CH_2$$

wherein R is selected from the group consisting of hydrogen and alkyl radicals having from 1 to 8 carbon atoms and an alpha-beta-ethylenically unsaturated carboxylic acid having from 3 to 8 carbon atoms, said copolymer having from 10 to 90 percent of the carboxylic acid groups ionized by neutralization with metal ions uniformly distributed throughout the copolymer, said copolymer being a direct copolymer of the alpha-olefin and the unsaturated carboxylic acid in which the carboxylic acid groups are randomly distributed over all molecules and in which (1) the alpha-olefin content of the copolymer is at least 50 mole percent based on the alpha-olefin-acid copolymer, (2) the unsaturated carboxylic acid content of the copolymer is from 0.2 to 25 mole percent, based on the alpha-olefin-acid copolymer, and (3) any other monomer component optionally copolymerized in said copolymer is monoethylenically unsaturated, and said metal ions being selected from the group consisting of mon, di and trivalent ions of metals in Groups, I, II, III, IV-A and VIII of the Periodic Table of Elements and having an ionized valence of from 1 to 3 inclusive when the unsaturated acid is a monocarboxylic acid and an ionized valence of 1 when the unsaturated acid is dicarboxylic acid and said metal ions being selected from the group consisting of uncomplexed and complexed metal ions, said ionic copolymers having solid state properties characteristics of crosslinked polymers and metal-fabricability properties characteristic of uncrosslinked, thermoplastic polymers.

2. The thermoplastic composition of claim 1 wherein the said polyolefin is polypropylene.

3. The thermoplastic composition of claim 1 wherein the said polyolefin is low-density polyethylene.

4. A reinforced thermoplastic composition comprising a polyolefin and uniformly dispersed throughout the said polyolefin polymer selected from the group consisting of low-density polyethylene, polypropylene and polybutene, from 10 to about 40 percent by weight of alpha-cellulose having adsorbed thereon from about 0.05 to about 35 percent by weight of an ionic hydrocarbon copolymer with the weight percent balance being said polyolefin, the said ionic hydrocarbon copolymer comprising a copolymer of an alpha-olefin having the formula:

$$R-CH=CH_2,$$

wherein R is selected from the group consisting of hydrogen and alkyl radicals having from 1 to 8 carbon atoms and an alpha-beta-ethylenically unsaturated carboxylic acid having from 3 to 8 carbon atoms, said copolymer having from 10 to 90 percent of the carboxylic acid groups ionized by neutralization with metal ions uniformly distributed throughout the copolymer, said copolymer being a direct copolymer of the alpha-olefin and the unsaturated carboxylic acid in which the carboxylic acid groups are randomly distributed over all molecules and in which (1) the alpha-olefin content of the copolymer is at least 50 mole percent based on the alpha-olefin-acid copolymer, (2) the unsaturated carboxylic acid content of the copolymer is from 0.2 to 25 mole percent, based on the alpha-olefin-acid copolymer, and (3) any other monomer component optionally copolymerized in said copolymer is monoethylenically unsaturated, and said metal ions being selected from the group consisting of mon, di and trivalent ions of metals in Groups I, II, III, IV-A and VII of the Periodic Table of Elements and having an ionized valence of from 1 to 3 inclusive when the unsaturated acid is a monocarboxylic acid and an ionized valence of 1 when the unsaturated acid is a dicarboxylic acid and said metal ions being selected from the group consisting of uncomplexed and complexed metal ions, said ionic copolymers having solid state properties characteristic of crosslinked polymers and melt-fabricability properties characteristic of uncrosslinked, thermoplastic polymers.

5. The thermoplastic composition of claim 4 wherein the said polyolefin is low density polyethylene.

6. The thermoplastic composition of claim 4 wherein the said polyolefin is polypropylene.

7. The thermoplastic composition of claim 4 wherein the alpha-beta-ethylenically unsaturated carboxylic acid in the said ionic hydrocarbon copolymer is mono-carboxylic.

8. The thermoplastic composition of claim 4 wherein the said ionic hydrocarbon copolymer the alpha-olefin of the formula $R-CH=CH_2$ is ethylene.

9. The thermoplastic composition of claim 4 wherein in the said ionic hydrocarbon copolymer the metal ion is an ion of an alkali metal.

10. The thermoplastic composition of claim 4 wherein the quantity of the ionic hydrocarbon copolymer adsorbed on the said alpha cellulose is from about 0.05 to about 0.50 weight percent.

* * * * *